Figure 1:
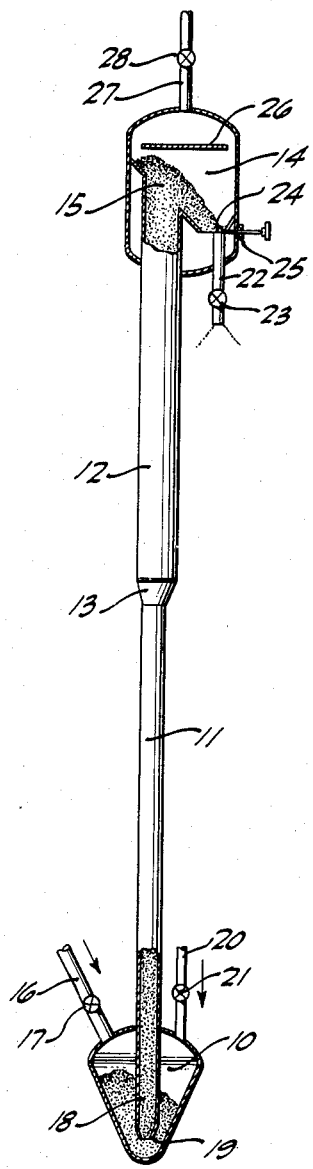

July 27, 1954  C. H. O. BERG  2,684,873
METHOD AND APPARATUS FOR THE CONVEYANCE OF GRANULAR SOLIDS
Filed March 13, 1950  2 Sheets-Sheet 1

$$\frac{\left(\frac{dp}{dl}\right)}{\rho_s \cos\theta}$$

$p$

INVENTOR.
CLYDE H. O. BERG,
BY
AGENT.

July 27, 1954  C. H. O. BERG  2,684,873

METHOD AND APPARATUS FOR THE CONVEYANCE OF GRANULAR SOLIDS

Filed March 13, 1950  2 Sheets-Sheet 2

INVENTOR.
CLYDE H. O. BERG,
BY
AGENT.

Patented July 27, 1954

2,684,873

UNITED STATES PATENT OFFICE 2,684,873

METHOD AND APPARATUS FOR THE CONVEYANCE OF GRANULAR SOLIDS

Clyde H. O. Berg, Long Beach, Calif., assignor to Union Oil Company of California, Los Angeles, Calif., a corporation of California Application March 13, 1950, Serial No. 149,323

35 Claims. (Cl. 302—53)

This invention relates to a method and an apparatus for the movement of granular solids in substantially compact form through conduits cocurrently with a depressuring conveyance fluid and in the absence of moving mechanical parts. More specifically this invention relates to an improvement in such a method and apparatus whereby the conveying effect of the conveyance fluid is reduced at a point just prior to the solids discharge point to a value less than that required for conveyance thereby establishing a "dead bed" of solids adjacent the discharge opening of the conveyance conduit. The presence of this dead bed of solids has been found to give beneficial effects to the operation of such a conveyance method in that an increased flexibility of operation and smooth start-up operations are permitted.

The conventional methods for transporting solids include the use of bucket elevators, drag lines, and moving belts which suffer from such detriments as inoperability under pressure, and undesirable high abrasion or attrition loss of solids, or the requirement of unusually large and expensive equipment to handle the flow rates of solids sometimes encountered in industrial operations. For example, the largest bucket elevators employed in circulating catalyst in a catalytic cracking process are limited to about 150 tons per hour capacity. In some catalytic processes as high as 800 to 1,000 tons per hour of catalyst circulation would be desirable and the cost and size of the bucket elevator equipment necessary to maintain such a circulation rate makes the operation economically noncompetitive.

It has been suggested that a suspension-type conveyer be employed in which great quantities of solids are circulated by means of suspending gas. In such a system the granular solid particles are separated from one another and free to move with respect to each other at fairly high velocities. Because of this and the inherent impact of particle against particle as well as the impact of the particles against the inner surfaces of the conveyer the attrition loss of the solids being circulated as well as the abrasion or erosion of the inner surfaces of the apparatus make this type of solids handling device less desirable.

The primary advantages of the method and apparatus of the present invention is its marked reduction in attrition and abrasion loss of the solids being conveyed, its simplicity of apparatus and operation, the absence of moving mechanical parts which ordinarily require expensive maintenance at high operating pressures, the absence of equipment erosion due to the fact that the solids are maintained in compact form and prevented from high velocity impact, and the ability of the apparatus to deliver solids at high flow rates in relatively small apparatus. The method and apparatus of the present invention is amenable to operation under any pressure and in addition is adapted to the conveyance of granular solids at extremely high flow rates in relatively small sized equipment, for example, a cracking catalyst flow rate of 667 tons per hour may be maintained according to the conveyance method and apparatus of this invention in a conduit having a minimum diameter of 18 inches and a catalyst circulation rate of 1,000 tons per hour may be maintained in a conduit having a diameter of from 22 to 24 inches.

The present invention is applicable to the conveyance of granular solids of any mesh size, to solids having a wide mesh size range, and with liquid or gaseous conveyance fluids. The present invention may be applied for the conveyance of solids such as catalyst circulation in the many known catalyst processes, the circulation of adsorbent in liquid or gaseous adsorption separation processes, and to such miscellaneous industrial operations as the conveyance of coal and coke, the moving of cereal grains into and out of elevators, and the transmission of ores in the many metallurgical processes. In short, wherever granular solids are moved and it is desirable to minimize the solids loss due to attrition and abrasion the present invention is applicable with advantage in an increased solids flow rate for a smaller equipment size, low attrition rate, and high operating efficiency.

It is an object of the present invention to provide an improved method for the conveyance of granular solids without the use of moving mechanical parts.

An additional object is to provide a process in which the conveyed solids are maintained as a continuous compact moving mass of granular solids within an elongated conveyance zone and are moved throughout the greater part of that zone under the influence of a cocurrently depressuring conveyance fluid.

Another object of this invention is to provide in such a conveyance process an improvement whereby the conveying force of the depressuring conveyance fluid is maintained at a value greater than that required for conveyance throughout the greatest portion of the conveyance zone and is maintained at a value less than that required for conveyance throughout a lesser portion adjacent the discharge outlet of the conveyance zone.

Another object of this invention is to provide a method for the conveyance of granular solids in the presence of a cocurrently depressuring conveyance gas in which the conveying effect of the depressuring gas is reduced to a value insufficient to convey the solids prior to discharging the solids from the conveyance zone thereby applying a restrictive force on the solids within the conveyance zone in order to maintain them in substantially compact form.

An additional object of the present invention is to provide an apparatus for the conveyance of granular solids which includes an elongated conveyance conduit opening into an expansion chamber and in which latter chamber conveyance force of the depressured conveyance fluid is maintained at a value less than that required for conveyance.

Other objects and advantages of this invention will become apparent to those skilled in the art as the description thereof proceeds.

In the present invention the term "substantially compact form" when referring to granular solids is meant to include solids at substantially their static bulk density; that is having the same pounds per occupied cubic foot of volume while in the apparatus of the present invention as those same solids have been at rest and in the absence of a conveying force of the conveyance fluid.

Briefly, the present invention comprises a method for conveyance of granular solids in substantially compact form through an elongated conveyance zone cocurrently with a depressuring conveyance fluid whereby the frictional forces developed as the fluid flows through the interstices of the compact granular mass are manifest as a pressure drop generates a conveying force expressed as a pressure drop per unit length of conveyance zone $$\left(\frac{dp}{dl}\right)$$

which is sufficient to counteract the forces of gravity and the friction on the mass of solids from the inner walls of the conveyance zone, which latter forces generally act in the opposite direction than the force of the depressuring conveyance fluid in a degree dependent upon the inclination of the conveyance zone. The magnitude of the conveyance forces compared with the magnitude of the gravitational forces acting in the opposite direction may be expressed as a dimensionless conveyance force ratio $$\frac{\left(\frac{dp}{dl}\right)}{\rho_s \cos\theta}$$

wherein $$\left(\frac{dp}{dl}\right)$$

is the pressure drop per unit length at any point in the conveyance zone expressed in consistent units such as pounds absolute per square foot per foot of length, $\rho_s$ is the bulk density of the granular solids in pounds per cubic foot, and $\theta$ is the slope of the conveyance zone with respect to the vertical. For vertical conveyance zones this ratio reduces to:

$$\frac{dp}{\rho_s dl}$$

When the velocity of the conveyance fluid is sufficient to generate within the conveyance zone a conveyance force ratio having a value at least equal to 1.0, the forces of gravity on the solids are overcome. A slight additional increase in conveyance fluid velocity is required to supply the energy necessary to counteract the frictional forces of the solids against the walls of the conveyance zone and to supply the momentum of putting the solids into motion. The magnitude of the minimum value of the conveyance force ratio required for movement of the solids varies between 1.0 and 1.5. The conveyance force ratio and its variation throughout the length of the conveyance zone is extremely important in the design of conveyance apparatus to permit smooth and stable operation of the conveyance process.

The method of this invention is characterized by the fact that adjacent the discharge outlet of the conveyance zone the moving granular solids are subjected to a thrust force in a direction opposite to that of solids flow for the purpose of maintaining the granular solids at all points in the conveyance zone as a substantially compact granular solids mass in order to prevent the effluent solids rate from exceeding the rate of conveyance in other parts of the zone which would result in the formation of voids in the line and a discontinuous bed of solids therein. In the present invention this thrust force is obtained in the region mentioned by reducing the conveyance force of the conveyance fluid to a value less than that required to convey the solids. Expressed in different terms, adjacent the discharge outlet of the conveyance zone an expansion zone is maintained wherein the value of the conveyance force ratio is reduced to a value less than the minimum value referred to above, namely to a value less than the minimum value of from 1.0 and about 1.5 above named, the actual minimum depending upon the nature of the granular solids. Preferably in the expansion zone the conveyance force ratio is reduced to a value less than 1.0 thereby establishing the aforementioned "dead bed of solids" in which the conveyance force of the cocurrently depressuring conveyance fluid is insufficient to convey the solids which therefore exert a gravitational thrust force in the opposite direction against the other solids following in the conveyance zone. The solids in the dead bed are moved through the expansion zone by the conveyance forces generated within the conveyance zone proper by the depressuring conveyance fluid therein and which forces are transmitted through the compact solids into the solids present in the expansion zone. Thus it is seen that the method of the present invention comprises depressuring a conveyance fluid through an elongated conveyance zone cocurrently with a moving mass of substantially compact granular solids, maintaining the solids therein in substantially compact form, reducing the conveying effect of the conveyance fluid adjacent the discharge opening of said conveyance zone to a value insufficient therein to convey said solids, and removing solids discharged from said conveyance zone.

One of the principal advantages realized from the method of the present invention lies in an unexpected increase in the flexibility of the conveyance process in that the pressure drop existing across the entire conveyance zone may fluctuate between rather wide limits without disrupting the operation of the conveyance apparatus. It is believed that this is due to the presence of the dead bed of solids, the depth of which may increase during periods of abnormally high pressure drop and subsequently can return to a normal depth upon resumption of design operating conditions. Under increased pressure drop operation the quantity and velocity of conveyance fluid increases of course and the depth of the dead bed of solids automatically rises to provide a greater thrust force on the solids following in the conveyance zone. If desired, the cross sectional area of granular solids in the expansion zone may be caused to increase proportionally with the quantity of conveyance fluid thereby providing a substantial constant disengaging area per unit quantity of conveyance fluid.

More specifically, an elongated conveyance zone is provided at its discharge outlet with an expansion zone and a separation zone. The conveyance zone extends into an induction zone to terminate with its inlet opening therein adjacent the lower extremity of the induction zone. Granular solids to be conveyed are introduced into the induction zone and submerge the conveyance zone's inlet opening. A conveyance fluid under pressure is introduced by a separate inlet into the induction zone and a fluid flow is established through the inlet opening sufficient to carry the granular solids into the conveyance zone. During start-up conditions the conveyance fluid pressure is gradually increased in steps until the conveyance zone has been substantially completely filled by removing solids from the induction zone. The expansion zone is last to be filled during the start up and its presence applies a thrust force as above described to maintain the granular solids in the conveyance zone in compact form. When the conveyance zone is filled the conveyance fluid pressure in the induction zone may be increased to its operating value, thereby establishing a cocurrent conveyance fluid flow sufficient to generate a conveyance force ratio which in turn is sufficient to cause movement of the entire mass of granular solids. As described below there may be a considerable variation in the value of the conveyance force ratio at various points within the conveyance zone and it is desirable to maintain a value of this ratio at all points within the conveyance zone proper in excess of the minimum value previously set forth. In the expansion zone a value less than this minimum is maintained and smooth operation and easy control of the process is obtained.

Figure 2:
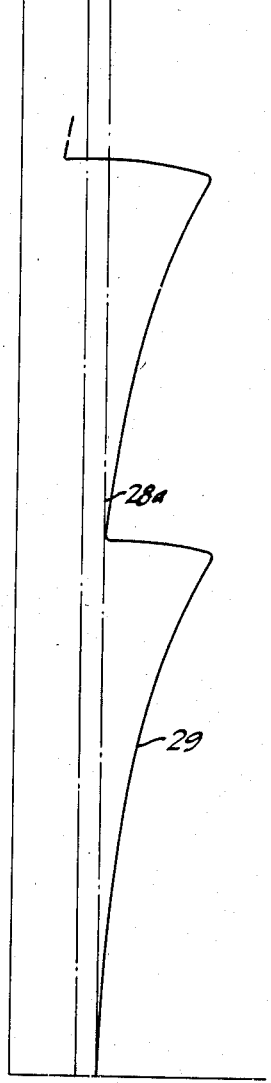
Figure 3:
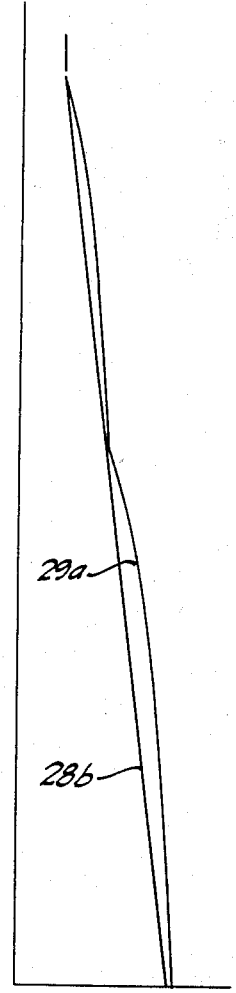
Figure 4:
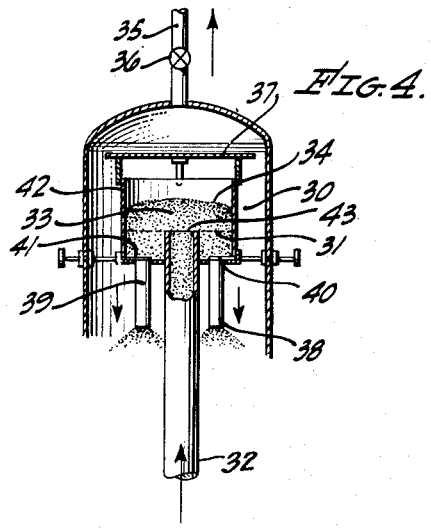
Figure 5:
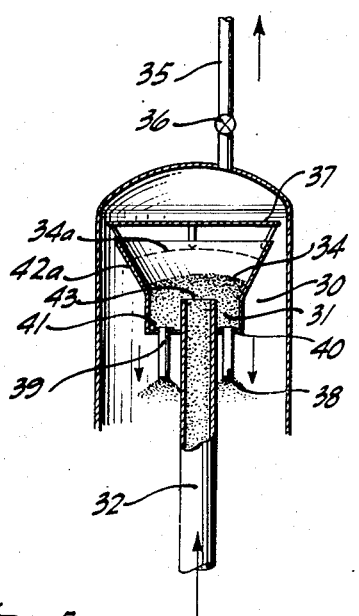
Figure 6:
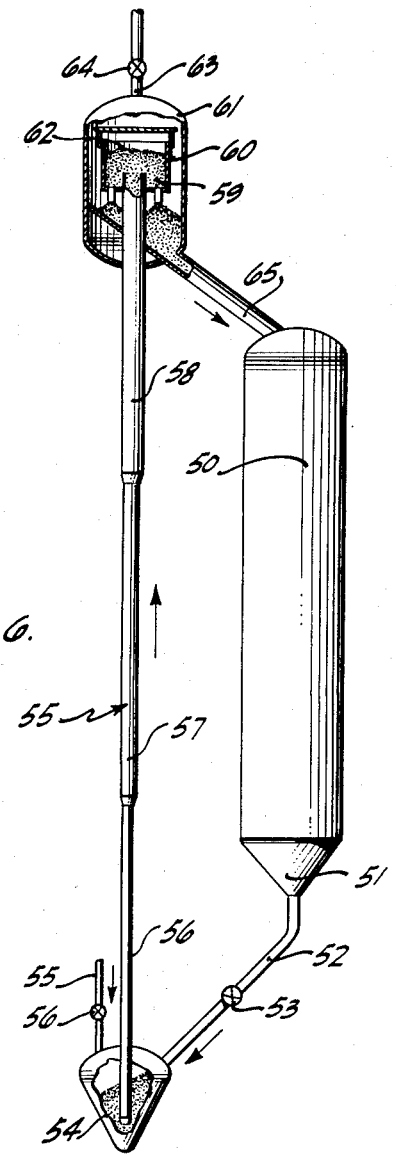

The method, apparatus and characteristics of the present invention will be more fully appreciated from a description of the accompanying drawings in which:

Figure 1 shows an elevation view in cross section of the conveyance apparatus of this invention, Figure 2 shows the variation in conveyance force ratio throughout the length of conveyance and expansion zones, Figure 3 shows the change in conveyance gas pressure throughout the conveyance zone, Figure 4 shows a modification of the conveyance and expansion zones of the present invention, Figure 5 shows an elevation view of the cross section of an expansion zone in which a variation in exposed area of discharging solids varies the depth of the dead bed, and Figure 6 shows an elevation view in pressure cross section of an apparatus in which the conveyance apparatus of the present invention is employed to maintain a solids circulation through a contacting vessel.

Referring now more particularly to Figure 1, the conveyance apparatus is made up of induction zone 10, a conveyance zone provided with lower section 11 and upper section 12 connected by expansion fitting 13, separator zone 14 provided with expansion zone 15. If desired, a tapered conveyance zone of increasing cross sectional area may be employed, subsequently described, in which a uniform conveyance force ratio is established. Granular solids to be conveyed are introduced via line 16 at a rate controlled by valve 17 and pass therethrough into induction zone 10 to surround that part 18 of the conveyance zone which extends into the induction zone and submerges inlet 19. The conveyance fluid is introduced under pressure via line 20 at a rate controlled by valve 21 to depressure through sections 11, 12 and 13 of the conveyance zone cocurrently with the moving mass of granular solids in substantially compact form. These solids discharge into separation zone 14 to form a dead bed of solids 15 therein. These solids flow by gravity through outlet line 22 controlled by valve 23. An orifice 24 of variable area controlled by means 25 is provided to control the maximum rate at which the granular solids may be discharged from the separation zone 14. Separation zone 14 is further provided with a plate 26 which in the case of upset operating conditions will enhance the restrictive thrust force normally provided by dead bed 15. The conveyance fluid is separated from the conveyed solids in separator zone 14 and is removed therefrom via line 27 at a rate controlled by valve 28.

Figures 2 and 3 are positioned with respect to Figure 1 so that the values of conveyance force and conveyance fluid pressure plotted as solid lines 29 and 29a are those corresponding to the positions within the conveyance apparatus on horizontal lines drawn between Figures 1, 2 and 3. The broken lines 28a and 28b indicate the value of conveyance force ratio and pressure for the tapered conveyance zone referred to previously and it is to be noted that a linear decrease in pressure with distance is obtained with the tapered line.

In Figure 2 the conveyance force ratio is shown at all points in the conveyance zone to be greater than 1.0. At the lower extremity of section 11 the conveyance ratio is equal to a value of about 1.3 which is sufficient to insure movement of the solids. In this installation the conveyance fluid is a gas and as it depressures through section 11 the velocity of conveyance gas flow through the section increases causing the value of the conveyance force ratio to increase in the direction of solids flow until it reaches a maximum in section 11 just below in expansion connection 13. The ratio of cross section areas of section 12 to section 11 is such that at the lower extremity of section 12 the conveyance force ratio is reduced approximately to the same value existing at the bottom of the next lower section, in this case about 1.3. Further expansion of the conveyance gas through section 12 again effects an increase in the conveyance force ratio, again reaching a maximum adjacent the upper extremity of section 12. At this point the provision of expansion zone 15 is sufficient, because of its increased cross sectional area, to decrease the value of conveyance force ratio in the expansion zone to a value substantially less than 1.0. The net force acting on the solids is that of gravity in this region and thereby a downward thrust force against the solids discharging from section 12 is maintained. The depth of the dead bed 15 is a function of the maximum value of the conveyance force ratio existing in the next lower section of the conveyance zone. The method of calculation of the depth of this dead bed will subsequently be given. The value of the conveyance force ratio is substantially constant throughout the tapered conveyance zone as shown by line 28a.

Referring now more particularly to Figure 3 a plot is shown of the conveyance gas pressure in the segmented conveyance zone and it is seen that the pressure decreases from the maximum value in the induction zone along curve 29a gradually to a point corresponding to expansion conneciton 13 from which point it depressures at a different rate until the gas pressure in separator zone 14 is reached. Curve 29a is the pressure curve for the segmented conveyance zone and curve 28b for the tapered modification.

Referring now more particularly to Figure 4 separator zone 30 is provided with expansion zone 31 into which solids discharging from conveyance zone 32 accumulate. A dead bed of solids 33 is established within expansion zone 31 and the conveyance fluid is disengaged from the solids-fluid interface 34 and removed from separator 30 by means of line 35 controlled by valve 36. A guard plate 37 is provided covering expansion zone 31 to prevent solids from entering the upper portion of separator zone 31 and contaminating the conveyance fluid removed therefrom. This plate is only a guard against unexpected upset conditions and otherwise unnecessary during ordinary operations. Expansion zone 31 is further provided with outlets 38 and 39 through which the solids pass for removal from the expansion zone 31.

Variable area orifices 40 and 41 are provided in each of these outlets to control the rate at which solids are discharged from the conveyance and expansion zones.

In Figures 1 and 4 are shown two modifications of expansion zone according to the present invention. In Figure 1 the solids are discharged from the conveyance zone at an angle into the expansion zone 15, section 12 of the conveyance zone having a bevelled outlet cut approximately at the angle of repose at the granular solids. In Figure 4 conveyance zone 32 discharges solids squarely into the expansion zone 31 contained within cylindrical vessel 42 having a substantially greater cross sectional area than that of conveyance zone 32.

If the orifices 40 and 41 are closed no solids may be discharged from expansion zone 31 and solids level or interface 34 will rise to an equilibrium height above the level denoted by the outlet opening 43 of conveyance zone 32 so that a downward thrust of solids within the dead bed 33 is sufficient to prevent further discharge of solids from conveyance zone 32. As the orifices 40 and 41 are opened a portion of the solids discharge from expansion zone 33 decreasing the depth of the dead bed, reducing the magnitude of the downward thrust force and permitting solids to discharge from lift line 32 at a rate equivalent to the rate at which they flow through the opened orifices. The apparatus therefore automatically adjusts itself to the flow rate corresponding to the open area of the orifices, the flow rate being substantially uneffected by the depth of solids above the orifices.

During upset conditions when for any reason at all the quantity of conveyance fluid flowing through conveyance zone 32 increases, the value of the conveyance force ratio at discharge opening 43 increases tending to increase the solids flow rate. However, at the same time the depth of the dead bed increases as does the downward thrust force tending to cause the system to return to its normal condition. During such upsets of increased conveyance pressure an increased quantity of conveyance fluid must of necessity be disengaged through solids-fluid interface 34.

Referring now to Figure 5 an expansion chamber is shown which may be employed with particular advantage under upset conditions of high conveyance fluid flow in which the rise of the dead bed of solids automatically provides an increased cross sectional area of interface so that the conveyance fluid may be disengaged at a sufficiently low velocity that substantially no suspension of solids or carry-over of solids through outlet 35 results. Elements having the same function as those shown in Figure 4 are designated therein with the same numbers. Chamber 42a containing expansion zone 31 is shown in which solids-fluid interface 34 varies in cross sectional area with the depth of solids therein. Under increasing conveyance fluid flow rates the solids level rises to level 34a at which point an increased area open for fluid disengagement is provided.

Another means for reducing the value of the conveyance force ratio in the expansion zone, not shown, involves the removal of a portion of the conveyance fluid prior to the point at which granular solids are discharged from the conveyance zone. By removing a sufficient quantity of the conveyance fluid the value of the conveyance force ratio may be reduced to a value insufficient to convey solids from the point of fluid removal to the point of solids discharge and the solids between these two points exert a thrust force in the opposite direction to that of solids flow. The solids are conveyed between these two points by virtue of the conveyance forces exerted prior to the point at which a portion of the conveyance fluid is removed, that is they are more or less extruded through the dead bed thus maintained adjacent the discharge opening of the conveyance zone.

Referring now more particularly to Figure 6, an elevation view of the apparatus of the present invention is shown applied to the circulation of granular solids through a contacting vessel 50 which may be provided with various inlets and outlets not shown for fluids to contact the solids passing therethrough. The solids are removed from bottom zone 51 of contacting vessel 50 passed through transfer line 52 at a rate controlled by valve 53 and are discharged into induction chamber 54. A conveyance fluid under pressure is introduced via line 55 controlled by valve 56 into the induction chamber to depressure through segmented conveyance zone 55 consisting of lower segment 56, intermediate segment 57 and upper segment 58 of increasing diameters. The solids are conveyed therethrough by means of the cocurrently depressuring conveyance fluid and discharge into expansion zone 59 contained within expansion chamber 60 which in turn is enclosed by separator chamber 61. A conveyance fluid disengages from the conveyed solids through interface 62 and is subsequently removed via line 63 controlled by valve 64 from separator chamber 61. The solids subsequently flow from expansion zone 59 through transfer line 65 and are returned to the upper portion of contacting vessel 50.

It should be understood, however, that the conveyance apparatus of this invention may be applied for the conveyance of solids from one vessel such as vessel 50 and discharged into a second vessel not shown and a second conveyance apparatus employed to return solids discharged from this second vessel to vessel 50.

It is further to be understood that the application of the present apparatus is independent of the type of solids fluid contact or reactions carried out within vessel 50 and other vessels, not shown, for the process of solids conveyance is applicable to any granular solids conveyed in substantially compact form as a continuous unbroken moving mass.

In order to permit the proper design of the conveyance apparatus of the present invention and to evaluate the factors which determine the characteristics of the expansion zone maintained adjacent the discharge outlet of the conveyance zone, a careful analysis of the characteristics of the solids to be transported as well as those of the fluid employed to convey them is required. It is important to consider whether or not the conveyance fluid moves in viscous or turbulent flow and the following discussion relates to the design relationship which permits the construction and operation of a segmented conveyance apparatus according to this invention from certain experimental data and the known characteristics of the solids and the conveyance fluid and the quantity of solids to be transported.

The design equations necessary for designing a conveyance conduit and expansion zone according to this invention are given as follows:

$$D = \left[\frac{Q}{5.87 \rho_s}\right]^{1/2} \quad (1)$$

$$\left(\frac{dp}{dl}\right) = C\rho^{n-1}V^n \quad (2)$$

$$\frac{\left(\frac{dp}{dl}\right)_2}{\left(\frac{dp}{dl}\right)_1} = \frac{A_2}{A_1} \quad (3)$$

$$\frac{\left(\frac{dp}{dl}\right)_2}{\left(\frac{dp}{dl}\right)_1} = \frac{1}{Z} + \frac{k_2}{k_1}\left[\frac{1}{Z} - 1\right] \quad (4)$$

$$k_1 = \frac{A}{CRT}\left(\frac{dp}{dl}\right)_1 \quad (5)$$

$$k_2 = \frac{aQ}{\rho_s RT} \quad (6)$$

$$Z = \frac{P_2}{P_1} \quad (7)$$

$$L = \frac{P_1 k_1}{\left(\frac{dp}{dl}\right)_1 k_2}\left[\left[\frac{k_1}{k_2}+1\right] ln\left[1+\frac{k_2}{k_1}-\frac{k_2 Z}{k_1}\right]+Z-1\right] \quad (8)$$

$$\frac{\left(\frac{dp}{dl}\right)_2}{\left(\frac{dp}{dl}\right)_1} = \frac{A_2}{A_1} \quad (9)$$

$$\frac{\left(\frac{dp}{dl}\right)_2}{\left(\frac{dp}{dl}\right)_1} = \frac{1}{Z}\left[1+\frac{k_2}{k_3}Z\right]^2 \quad (10)$$

$$k_3 = A\left(\frac{dp}{dl}\right)_1^{1/2}\left(\frac{1}{CRTMP_1}\right)^{1/2} \quad (11)$$

$$L\frac{P_1}{\left(\frac{dp}{dl}\right)_1}\left[\frac{k_3}{k_2}\right]^2\left[\frac{1+\frac{k_3}{k_2}}{1+\frac{k_3}{k_2}-Z}-\frac{1+\frac{k_3}{k_2}}{\frac{k_3}{k_2}}+ln\frac{1+\frac{k_3}{k_2}-Z}{\frac{k_3}{k_2}}\right] \quad (12)$$

$$H = \frac{D_e}{4\phi_e} ln\left[\frac{\left(\frac{dp}{dl}\right)_w}{\rho_s}-1}{1-\frac{\left(\frac{dp}{dl}\right)_w}{\rho_s}\left[\frac{Dw}{De}\right]^{2n}}\left[\frac{\phi e}{\phi w}\right]\left[\frac{Dw}{De}\right]+1\right] \quad (13)$$

The significance of the symbols used in the foregoing equations may be determined from the following table of nomenclature.

*Nomenclature*

$a$    Fraction of voids in granular solids.
$A$    Cross sectional area of the conduit, square feet.
$C$    Proportionality factor relating pressure drop to conveyance fluid velocity in $$\left(\frac{dp}{dl}\right) = CV^n \rho^{n-1}$$

where $n=1$ for viscous and 2 for turbulent flow. Equation 2.
$D$    Diameter of conduit, feet.
$e$    Subscript referring to expansion zone.
$H$    Height of dead bed rise in expansion zone, feet.
$l$    Differential form of L, distance in feet.
$L$    Length of conduit section being designed, feet.
$M$    Molecular weight of the conveyance fluid.
$n$    Superscript, 1 for viscous flow and 2 for turbulent flow.
$P$    Conveyance fluid pressure, pounds per square foot absolute.
$Q$    Solids flow rate, pounds per second.
$R$    Gas constant, 1543 foot pounds per pound mol per ° R.
$T$    Absolute temperature, ° R.
$V$    Superficial conveyance fluid velocity, feet per second.
$Z$    Ratio of conveyance fluid pressure at outlet of section to that of inlet.
$1$    Subscript referring to inlet end of a given section.
$2$    Subscript referring to outlet of a given section.
$\rho$    Density of conveyance fluid, pounds per cubic foot.
$\rho_s$    Bulk density of solids, pounds per cubic foot of occupied volume.
$\phi$    Coefficient of friction of solids.
$\mu$    Conveyance fluid viscosity in centipoises.

Equation 1 expresses a relationship between the minimum diameter of the conveyance conduit expressed as a function of the solids flow rate and the bulk density of the granular solids, and it is from this equation that the diameter of the smallest cylindrical section or the minimum diameter of a tapered conduit is determined from the granular solids flow rate in a particular installation. Equation 2 permits the experimental valuation of the pressure drop per unit length characteristic of a given type of granular solids with a given conveyance fluid. If desired, this may be calculated from literature references pertaining to the flow of fluids through compact beds of the particular solids being handled. Equations 3 through 8 are the design relationships which apply when the conveyance fluid flows in viscous flow, and Equations 9 through 12 relate to a conveyance fluid in turbulent flow. The type of flow of the conveyance fluid, whether viscous or turbulent, may be determined from Figure 17, page 829 of the second edition of Perry's Chemical Engineers Handbook (McGraw-Hill), or from Chilton and Colburn's article in Transactions of the American Institute of Chemical Engineers, volume 26 (1931), page 178.

Equations 3 and 9 show the relationship between the cross sectional areas of successive sections in a segmented conveyance conduit and the pressure drop per unit length at the outlet of one section and the inlet of the next section for the particular case in which it is desired to maintain the conveyance force ratio at the inlet of each individual section of the conveyance zone the same. Equations 4 and 10 express the ratio of the conveyance force ratios as functions of the pressure at the inlet and outlet of a given section and of the ratio of factors $k_1$ and $k_2$. Equation 5 expresses $k_1$ as the quantity of gas required to give a given pressure drop per unit length at the entrance of a given section of the conduit, and Equation 6 expresses $k_2$ as the volume of gas accompanying the solids in the void spaces. Equation 7 shows the symbol Z to be equal to the ratio of the conveyance fluid pressure at the outlet of a given section to pressure at the inlet of the same section. Equations 8 and 12 are equations which permit the calculation of the length of the section being designed in terms of the inlet pressure $P_1$, the pressure ratio Z referred to above, factors $k_1$ and $k_2$, and the inlet conveyance force ratio. Equation 13 permits the calculation of the height to which the granular solids rise in the expansion zone above the point designated by the inlet opening of the conveyance conduit.

The use of the foregoing design equations may be illustrated by the design of a conduit according to this invention which transports 42 tons/hour of granular activated charcoal 15.0 feet in a vertical direction. The conveyance fluid is air in viscous flow entering at 20 p. s. i. ga. and 60° F. The solids density is 35 pounds per cubic foot and under these conditions factor C in Equation 2 was determined experimentally to be 120. From Equation 1 it was calculated for a flow rate of 46 tons per hour (26.5 pounds per second) and a bulk density of 35 pounds per cubic foot that a diameter of 0.533 foot was required. The nearest standard pipe was the nominal 6 inch size, such a pipe having a diameter of 6.065 inches and a cross sectional area of 0.20 square foot. The next larger size is nominal 8 inch pipe having an area of 0.347 square foot.

A value of 1.2 was chosen as minimum for the conveyance force ratio $$\frac{\left(\frac{dp}{dl}\right)_1}{\rho_s \cos \theta} = 1.2$$

from which a minimum $$\left(\frac{dp}{dl}\right)_1$$

for the inlet of the 6-inch section of 42 pounds per square foot per foot was calculated. It is desirable that this minimum value exist at the inlet of each successive section of the conveyance conduit and from Equation 3 therefore the maximum value for the 6-inch section may be calculated as 72.6 pounds per square foot per foot. The ratio of $k_1/k_2$ was then calculated from Equations 5 and 6 for the 6-inch section which was 0.232. From Equation 4 the value of Z is then determined to be 0.880 indicating that for an inlet pressure of 20 p. s. i. ga. (34.7 p. s. i. a.) the pressure $P_2$ at the outlet of the 6-inch section is 30.5 p. s. i. a. or 15.8 p. s. i. ga. This value of pressure is also the inlet pressure $P_1$ for design of the 8-inch section. From Equation 8 next is calculated L, the length of the 6-inch section which is 11.0 feet. The length of the 8-inch section must therefore be 4.0 feet to complete the conveyance conduit to 15.0 feet in height.

For the 8-inch section a new value of the ratio $k_1/k_2$ is calculated from Equations 5 and 6 and is found to be 0.40. From Equation 8 next is calculated the value of Z which is 0.95 and the pressure of the 8-inch section outlet is (0.95) (30.5) —14.7 or 14.3 p. s. i. ga. Next, the pressure drop per foot at the top of the 8-inch section is calculated from Equation 4 to be 49.8 pounds per square foot per foot.

Recapitulating the design thus far, the conduit comprises a lower 6-inch pipe 11.0 feet long opening into an upper 8-inch pipe 4.0 feet long. The air pressure drops from 20 p. s. i. ga. to 15.8 p. s. i. ga. in the 6-inch section and from 15.8 p. s. i. ga. to 14.3 p. s. i. ga. in the 8-inch section. The minimum value of conveyance force ratio at the inlet to each section is 1.2 or 42 pounds per square foot per foot while the maxima are 72.6 and 49.8 pounds per square foot per foot in the 6 and 8 inch sections respectively.

For designing the expansion zone in which the conveyance force ratio is reduced to below 1.0 Equations 3 and 13 are used. From the value of $$\left(\frac{dp}{dl}\right)_w$$

of the conveyance conduit (here a value of 49.8 pounds per square foot per foot) a cross sectional area of expansion zone is estimated which will reduce $$\left(\frac{dp}{dl}\right)_e$$

to less than 35 pounds per square foot per foot. Choosing a conveyance force ratio of about 0.85 as suitable in the expansion zone (equivalent here to about 30 pounds per square foot per foot) a required cross sectional area of 0.58 square foot for the expansion zone is calculated. The nearest nominal pipe size is 10 inches in diameter. From Equation 13 the height to which the solids rise above the outlet of the 8-inch section is found to be 0.220 foot or 2.64 inches. The depth of the expansion zone is therefore made 10–12 inches deeper than this to allow for upset conditions. Therefore, an expansion zone of 10 inch schedule 10 pipe and 14 inches long is placed concentrically about the discharge opening of the 8-inch section.

Operation of the thus designed conveyance conduit proved that it would successfully convey the desired rate of solids (46 tons per hour) at less than the inlet pressure of 20 p. s. i. ga. indicating a conservative design.

The foregoing discussion in which design equations have been given permits the design of a conveyance apparatus of this invention to be applied in the transportation of granular solids by means of a concurrently depressuring conveyance fluid and in which a dead bed of granular solids is maintained in an expansion zone into which the granular solids are discharged from the conveyance line. It is to be understood that the conveyance process and apparatus may be applied to virtually any process in which almost any type of granular solids are circulated or conveyed.

A variation in the degree of restriction of the inlet opening to the conveyance conduit produces marked changes in the operational characteristics. With narrow ranges of mesh size, such as from 10–16 or from 20–26, little or no restriction is required to insure adequate entrance flow of solids. It has been found that some restriction is often necessary particularly where the particles of the granular solids to be conveyed have a wide range of mesh sizes, as for example from 5–60 or 20–100 mesh. The approximate degree of restriction required is that which will produce a conveyance fluid velocity through the inlet restriction which is equal to or greater than the average terminal velocity of the largest 10% fraction of granular solids. When less restriction is used at the conveyance conduit inlet the conveyance fluid velocity at that point is decreased which tends to cause the formation of a compact granular solids mass only in the upper reaches or nearest the discharge outlet of the conduit. That part of the conduit which is nearest the solids inlet will contain a dilute phase of solids suspended in conveyance fluid while the remainder will contain a moving compact solids mass and through which mass substantially all of the conveyance conduit pressure differential exists. As above stated, this "two phase" effect in the conveyance conduit is obtained by insufficiently restricting the conduit entrance and operating with a fluid velocity less than the terminal velocity of the largest 10% solids fraction. The same effect may be obtained by separately introducing conveyance fluid into the conveyance conduit or lift line at a pressure intermediate the inlet and outlet pressures and at a point intermediate the inlet and outlet openings. Under these conditions, that part of the lift line below the separate introduction point contains a suspension of solids.

In the "dilute phase" adjacent the solids inlet end of the conveyance conduit the granules are free to move and impact one another and the walls of the conduit. The attrition rate has been found to be materially greater in this region than in the compact solids region.

This increased attrition rate may be used to advantage in such processes as hydrocarbon cracking or coking in which a hydrocarbon is contacted with heated granules of coke on which a thin layer of coke is deposited. The coke granules gradually increase in size thereby altering the pressure drop and other operational characteristics of the conveyance conduit. In such hydrocarbon pyrolysis operations the size of the coke granules may be controlled by directly burning them with an oxygen-containing gas whereby they are reheated for recirculation and also reduced in size. In many cases, direct combustion of the coke is difficult to control. Flue gas reheating may be used instead and the inventory of circulating coke is maintained constant by removing a stream of coke in amount equivalent to the rate of coke laydown. The natural increase in the size of the coke particles may be reduced and controlled by operating the conveyance conduit with two phases as explained above and in the dilute phase of which a sufficient attrition rate is maintained to prevent the uninhibited coke particle size increase. Baffles or other devices may be incorporated in the dilute phase portion of the conveyance conduit to increase the attrition rate, if necessary, by providing additional impact surfaces by means of which a fraction of the granular solids conveyed are broken down into smaller sizes.

For example, in a continuous coking operation employing a conveyance apparatus according to this invention 6.7 tons per hour of ⅛"–¾" coke granules are circulated through a contact coking column by means of a tubular conduit having a lower 6-inch diameter section 31 feet high and an upper 8-inch diameter section 31 feet high. A circular restriction 2 inches in diameter placed at the inlet opening of the 6-inch section created a sufficient inlet conveyance fluid velocity to permit the entire conveyance conduit to operate while filled with a compact mass of moving granular solids and an increase in the average diameter of the coke particles was noted. Upon inserting a restriction 3 inches in diameter, the 6 inch diameter section of the conduit during conveyance contained a dilute phase or suspension of particles in the conveyance fluid and a higher attrition rate and reduction in coke particle size resulted.

It is to be understood that the conveyance conduits of the present invention may have cross sections which are square, circular, or other shapes and that the method operates satisfactorily with any of them. Furthermore the conveyance fluids may be gaseous as herein discussed or liquids in which case the small coefficient of expansion with decrease in pressure renders it possible to have in a conduit of constant cross sectional area a conveyance force ratio which is substantially constant.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for conveying granular solids through a conveyance zone which comprises maintaining an accumulation of said solids submerging the inlet of a conveyance zone, passing a conveyance fluid through said conveyance zone at a rate sufficient to convey said solids cocurrently with said conveyance fluid from said inlet to the outlet of said conveyance zone, applying a compacting force against the solids discharging at said outlet so as to maintain the solids at substantially their static bulk density as a substantially compact bed at said outlet and throughout said conveyance zone, and removing said solids and said conveyance fluid from said outlet, said compacting force being applied at the conveyance zone outlet by the step of reducing the conveyance force of the conveyance fluid to a value insufficient to convey said solids in a portion of the bed of conveyed solids immediately adjacent the outlet of said conveyance zone whereby said bed alone exerts said compacting force at this point.

2. A method according to claim 1 in which the reduction of conveyance force is accomplished by removing part of the conveyance fluid from contact with the solids within said conveyance zone at a point adjacent the outlet opening thereof.

3. A method according to claim 1 in which the reduction of conveyance force is accomplished by passing the mixture of solids and conveyance fluid through an expansion zone of larger cross-sectional area than the conveyance zone, and controlling the rate of solids removal from said expansion zone while solids discharge thereinto from said conveyance zone to establish and maintain within said expansion zone a bed of discharged solids which submerges the outlet opening of said conveyance zone.

4. In a method for the conveyance of granular solids in which granular solids are conveyed as a continuous mass substantially at their static bulk density through a conveyance zone under the influence of a cocurrently flowing depressuring conveyance fluid, the improvement which comprises maintaining a mass of conveyed granular solids adjacent and submerging the discharge opening of said conveyance zone, establishing and maintaining conveyance forces generated by said conveyance fluid flowing within said mass of solids which are insufficient to convey the same whereby said mass alone exerts a reverse force upon the solids discharging from said conveyance zone to manitain said granular solids therein at substantially their static bulk density during conveyance, separating said conveyance fluid from the conveyed solids, and removing solids from said mass of solids at a rate controlled to maintain the existence of said mass of solids.

5. A method for conveying granular solids through a conveyance zone through which they would not flow in the same direction under the influence of gravity alone which comprises introducing granular solids and a conveyance fluid into said conveyance zone, depressuring the conveyance fluid therethrough cocurrently with said granular solids at a rate of pressure drop sufficient to convey said solids through said conveyance zone, discharging solids from said conveyance zone into a discharge zone, removing conveyed solids and said conveyance fluid from said discharge zone, maintaining conveyance forces therein at a value insufficient to convey said solids and controlling the rate of solids withdrawal therefrom thereby establishing a dead bed of solids submerging the outlet opening of said conveyance zone and which dead bed of solids alone exerts a thrust force in opposition to solids flow from said conveyance zone so as to maintain the solids therein substantially at the static bulk density thereof.

6. A method for conveying granular solids through a conveyance zone through which they would not flow in the same direction by gravity alone which comprises maintaining an accumulation of granular solids to be conveyed in an induction zone so as to submerge the inlet opening of a conveyance zone communicating therewith at a point below the level of said accumulation, maintaining a flow of conveyance fluid from said induction zone through the interstices of a compact mass of said solids within said conveyance zone at a rate sufficient to convey said solids therethrough to the outlet opening of said conveyance zone, and removing the conveyed solids from said outlet opening as a moving bed, said solids in said induction zone, said conveyance zone and at said outlet opening being maintained as a granular mass having a bulk density substantially equal to the static bulk density of said solids when at rest by the step of controlling the rate of solids removal from adjacent the outlet opening of said conveyance zone so as to build up and maintain at this point a dense bed of conveyed solids which submerges said outlet opening and alone applies the thrust force to solids discharging from said outlet opening of said conveyance zone to maintain said static bulk density.

7. In a method for the conveyance of granular solids in which granular solids are conveyed as a continuous substantially compact stream through a conveyance zone under the influence of a cocurrently flowing depressuring conveyance fluid, the improvement which comprises establishing an expansion zone communicating with the outlet opening of said conveyance zone, discharging granular solids and conveyance fluid therefrom into said expansion zone, maintaining by means of a cocurrent flow of conveyance fluid conveyance forces within said conveyance zone sufficient to convey said solids, maintaining forces within said expansion zone insufficient to convey said solids therein to submerge said conveyance zone outlet opening in a bed of conveyed solids which alone exerts a thrust force against solids discharging from said conveyance zone to maintain said granular solids throughout said conveyance zone at substantially their static bulk density, disengaging said conveyance fluid from the granular solids bed in said expansion zone and simultaneously controlling the rate of granular solids flow through said conveyance zone, and maintaining said bed of conveyed solids submerging said outlet thereof by the step of controlling the rate of solids removal from said expansion zone.

8. A method for conveying granular solids which comprises establishing a conveyance zone, introducing granular solids into said conveyance zone, depressuring a conveyance fluid therethrough cocurrently with said granular solids, controlling the flow rate of said conveyance fluid to establish conveyance forces sufficient to convey said solids in said conveyance zone, discharging solids from said conveyance zone into a solids receiving zone, controlling the rate of removal of said solids therefrom to establish and maintain a bed of discharged solids therein which submerges the outlet opening of said conveyance zone, reducing conveyance forces within the submerging bed to a value insufficient to convey said solids whereby said submerging bed alone exerts a force in opposition to solids discharge from said conveyance zone thereby maintaining said solids during conveyance through said conveyance zone at a bulk density substantially equal to the static bulk density thereof at rest, and removing said conveyance fluid from said solids receiving zone.

9. A method for the conveyance of granular solids which comprises establishing an elongated conveyance zone communicating at its outlet with an expansion zone having greater cross-sectional area than that of said outlet, introducing granular solids into said conveyance zone, cocurrently depressuring a conveyance fluid through said solids in said conveyance zone to establish conveying forces sufficient to convey said solids, discharging solids from said conveyance zone into said expansion zone, maintaining conveying forces therein insufficient to convey said solids thereby submerging the conveyance zone outlet opening in a dead bed of discharged solids which alone applies a force against other discharging solids to maintain said solids in said conveyance zone substantially at their static bulk density, removing separated conveyance fluid from said expansion zone, and controlling the rate of removal of conveyed solids therefrom to maintain the presence of said dead bed therein.

10. A method for the conveyance of granular solids which comprises establishing an induction zone, a solids receiving zone, and a conveyance zone communicating therebetween, introducing solids into said induction zone, introducing a conveyance fluid into said induction zone under pressure relative to that of said solids receiving zone thereby depressuring said conveyance fluid through said conveyance zone cocurrently with granular solids to establish conveyance forces sufficient to convey said granular solids from said induction zone through said conveyance zone into said solids receiving zone, controlling the rate of removal of the thus conveyed solids therefrom to establish and maintain a bed of conveyed solids therein submerging the outlet opening of said conveyance zone, maintaining said conveyance fluid flow through the submerging bed at a value insufficient to convey the solids therein whereby said submerging bed alone exerts a thrust force against other solids discharging from said conveyance zone to maintain said solids during conveyance substantially at their static bulk density, and removing said conveyance fluid from said solids receiving zone.

11. A method according to claim 10 wherein the rate of solids conveyance is also controlled by varying the rate at which granular solids are withdrawn from said submerging solids bed maintained in said solids receiving zone.

12. A method for the conveyance of granular solids which comprises establishing an elongated conveyance zone opening into an expansion zone, introducing granular solids into said conveyance zone, cocurrently depressuring a conveyance fluid through solids in said conveyance zone at a rate sufficient to maintain therein a conveyance force ratio, defined as $$\frac{\left(\frac{dp}{dl}\right)}{\rho_s \cos \theta}$$

(wherein $$\left(\frac{dp}{dl}\right)$$

is pressure drop per unit length in pounds per square foot per foot, $\rho_s$ is the bulk density of the granular solids in pounds per cubic foot, and $\theta$ is the angular deviation of the axis of the conveyance zone from the vertical), having a value greater than 1.0 and sufficient to convey said solids therethrough, maintaining a value of said conveyance force ratio in said expansion zone at a value insufficient to convey said solids therein thereby submerging the outlet opening of said conveyance conduit in a bed of compact solids which alone exerts a thrust force counter to the flow of solids from said conveyance zone to maintain said solids therein at substantially their static bulk density, removing conveyance fluid from said expansion zone, and removing conveyed solids from said expansion zone at a rate controlled to maintain said bed of solids submerging said outlet opening.

13. A method according to claim 12 in combination with the step of maintaining said conveyance force ratio at a value less than about 1.0 in said expansion zone.

14. A method according to claim 12 wherein said expansion zone is maintained within a separator zone in combination with the steps of passing conveyance fluid from said expansion zone into said separator zone, passing granular solids from said expansion zone into said separator zone, and separately removing said solids and said conveyance fluid from said separator zone.

15. A method according to claim 12 wherein the rate of granular solids conveyance is controlled by controlling the rate at which solids are removed from said expansion zone.

16. A method for conveying granular solids through a conveyance zone which comprises maintaining an accumulation of said solids at the inlet of a conveyance zone, passing a conveyance fluid through said conveyance zone so as to convey said solids cocurrently with said conveyance fluid from said inlet to the outlet of said conveyance zone and into a solids receiving zone, controlling the rate of solids removal therefrom so as to establish and maintain a bed of discharged solids therein which submerges the outlet opening of said conveyance zone and which alone applies a compacting force against other solids discharging at said outlet so as to maintain the solids at substantially their static bulk density at said outlet and throughout said conveyance zone, and removing said conveyance fluid from said solids receiving zone, the conveyance force ratio $$\frac{\frac{dp}{dl}}{\rho_s \cos \theta}$$

(wherein $$\frac{dp}{dl}$$

is the conveyance fluid pressure gradient in pounds per square foot per foot, $\rho_s$ is the bulk density of the substantially compact unfluidized granular solids, and $\theta$ is the angular deviation of the axis of the conveyance zone from the vertical) being maintained at a value between about 1.0 and 1.5 in said conveyance zone by the step of controlling the rate of conveyance fluid flow therethrough, and the conveyance force ratio being maintained at a value less than this value within said bed of discharged solids in said solids receiving zone by reducing the conveyance fluid velocity therethrough.

17. A method for the conveyance of granular solids which comprises establishing an elongated conveyance zone communicating between an induction zone and a separator zone, introducing granular solids to be conveyed into said induction zone thereby submerging the inlet opening of said conveyance zone within said induction zone with granular solids to be conveyed, separately introducing a conveyance fluid under pressure relative to that of said separator zone into said induction zone thereby depressuring said conveyance fluid cocurrently through said conveyance zone with said granulad solids, controlling the rate of said conveyance fluid flow sufficient to generate a conveyance force ratio, defined as $$\frac{\left(\frac{dp}{dl}\right)}{\rho_s \cos \theta}$$

(wherein $$\left(\frac{dp}{dl}\right)$$

is the conveyance fluid pressure drop per unit length in pounds per square foot per foot, $\rho_S$ is the bulk density of the granular solids in pounds per cubic foot, and $\theta$ is the angular deviation of the axis of the conveyance zone from the vertical), within said conveyance zone having a value greater than 1.0 thereby conveying said granular solids therethrough, discharging granular solids from said conveyance zone into an expansion zone maintained within said separator zone to form a dead bed of discharged solids which submerges the conveyance zone outlet within said expansion zone, maintaining a conveyance force ratio within said dead bed of solids having a value less than 1.0 whereby said dead bed alone exerts a thrust force counter to the flow of granular solids from said conveyance zone to maintain said solids therein at substantially their static bulk density, disengaging said conveyance fluid from said solids in said dead bed, passing said conveyance fluid from said expansion zone to said separator zone, removing said conveyance fluid therefrom, and removing granular solids at a controlled rate of flow from said expansion zone to maintain said dead bed of solids therein.

18. A method according to claim 17 wherein said conveyance fluid is a gas.

19. A method according to claim 17 including the steps of successively reducing the value of said conveyance force ratio within said conveyance zone to lower values greater than 1.0 as said granular solids are conveyed therethrough.

20. A method according to claim 17 including the step of maintaining a substantially constant conveyance force ratio throughout said conveyance zone.

21. The method of conveying solid particles which comprises maintaining a vertical column of the particles in a conduit from the inlet to the discharge outlet thereof by continuously supplying particles at the inlet of the conduit as they are discharged at the outlet, advancing the column through the conduit by subjecting it to a fluid pressure applied continuously at the inlet end of the conduit, submerging the discharge of the particles from the outlet of the conduit by other particles, and injecting a compressed fluid into the conduit at a point beyond the first point of fluid application whereby the particles in said conduit between the point of injection of compressed fluid and the outlet end of said conduit are in dense packed mass form and the particles in said conduit between the point of injection and the inlet end of said conduit are in aerated form.

22. An apparatus for the conveyance of granular solids which comprises an elongated conveyance conduit, means for maintaining an accumlation of said solids at the inlet of said conveyance conduit, means for passing a conveyance fluid through said conveyance conduit to convey said solids concurrently with said conveyance fluid from said inlet to the outlet of said conveyance conduit, means for removing said solids and said conveyance fluid from said outlet, and means for reducing the velocity of said conveyance fluid adjacent said outlet to a value insufficient to convey said solids to surround said outlet with a bed of substantially compact solids which alone applies a force against other solids discharging from said outlet to maintain said solids in said conveyance conduit at a bulk density substantially equal to the static bulk density of said solids when at rest.

23. An apparatus for conveying granular solids through a conveyance zone which comprises means for maintaining an accumulation of said solids at the inlet of a conveyance conduit, means for passing a conveyance fluid through said conveyance conduit so as to convey said solids cocurrently with said conveyance fluid from said inlet to the outlet of said conveyance conduit, means for applying a compacting force at said outlet so as to maintain the solids substantially at the solids' static bulk density at said outlet and throughout said conveyance conduit, and means for removing said solids and said conveyance fluid from said outlet, said means for applying a compacting force at the conveyance conduit outlet comprising an expansion chamber of larger cross-sectional area than the conveyance conduit and disposed in solids-receiving relation thereto and adapted to contain a dead bed of solids in substantially compact form around and above said outlet.

24. An apparatus according to claim 23 in combination with means for removing part of the conveyance fluid from said conveyance conduit and from contact with the solids therein near the outlet of said conveyance conduit so as to maintain a dead bed of solids beyond this point which serves as the means for applying a compacting force at said outlet.

25. An apparatus for conveying granular solids through a conveyance zone through which they would not flow in the same direction under the influence of gravity alone which comprises an elongated conveyance conduit having an inlet opening, an induction chamber communicating with said inlet opening, a separator chamber communicating with the outlet opening of said conveyance conduit, means for introducing granular solids into said induction chamber, means for maintaining said induction chamber at a pressure in excess of the pressure of said separator chamber thereby depressuring a conveyance fluid through said conveyance conduit cocurrently with said granular solids, means for controlling the flow rate of said conveyance fluid to generate forces in said conveyance conduit sufficient to convey said solids, means in said separator chamber adapted to reduce said forces within the compact bed of conveyed solids adjacent the conveyance conduit outlet to a value insufficient to convey said solids and to surround and submerge the conduit outlet with a "dead bed" of solids at substantially their static bulk density thereby exerting a thrust force against solids discharging from said conveyance conduit to maintain said granular solids throughout said conveyance conduit at substantially the static bulk density thereof, and means for removing said conveyance fluid and conveyed solids from said separator chamber.

26. An apparatus for the conveyance of granular solids which comprises an elongated conveyance conduit having an inlet opening, an induction chamber communicating with said inlet opening, a separator chamber communicating with the outlet opening of said conveyance conduit, means for introducing granular solids into said induction chamber, means for maintaining said induction chamber at a pressure in excess of the pressure of said separator chamber thereby depressuring a conveyance fluid through said conveyance conduit cocurrently with said granular solids, means for controlling the flow rate of said conveyance fluid to generate forces in said conveyance conduit sufficient to convey said solids, means in said separator chamber adapted to reduce said forces to a value insufficient to convey said solids and to surround and submerge the conduit outlet with a "dead bed" of substantially compact unfluidized solids thereby exerting a thrust force against solids discharging from said conveyance conduit to maintain said granular solids in said conveyance conduit in substantially compact form, and separate means for removing said conveyance fluid and conveyed solids from said separator chamber.

27. An apparatus for the conveyance of granular solids which comprises an elongated conveyance conduit, an induction chamber surrounding the inlet opening of said conveyance conduit, a separator chamber surrounding the outlet opening of said conveyance conduit, means for introducing granular solids into said induction chamber and to submerge said inlet opening therewith, means for establishing in said induction chamber an elevated pressure relative to said separator chamber, means for introducing a conveyance fluid into said induction chamber at a point above the level of solids therein to be conveyed, means for cocurrently depressuring said conveyance fluid cocurrently with moving granular solids through said conveyance conduit, means within said separator chamber for reducing the conveyance forces generated by said conveyance fluid to a value insufficient for conveyance and adapted to establish thereby a dead bed of compact unfluidized solids adjacent to and submerging the discharge opening of said conveyance conduit, means for removing conveyance fluid from said separator chamber, and means for removing conveyed solids therefrom.

28. An apparatus according to claim 27 wherein said separator chamber contains an expansion chamber surrounding the outlet opening of said conveyance conduit, the cross sectional area of said expansion chamber being sufficiently larger than that of said conveyance conduit to decrease the conveyance forces to a value insufficient to convey said granular solids, outlet means from said expansion chamber for the removal of granular solids therefrom, and said outlet means being provided with means for controlling the flow rate of granular solids passing therethrough.

29. An apparatus according to claim 28 wherein said expansion chamber has a lower cylindrical portion and an upper flared portion, said expansion chamber being provided with openings of controllable area for the removal of granular solids from said expansion chamber at a controllable flow rate.

30. In an apparatus for the conveyance of granular solids which comprises an elongated conveyance conduit, an induction chamber communicating with the inlet opening thereof, means for introducing granular solids thereinto, means for introducing a conveyance fluid thereinto at a point above solids therein to be conveyed and adapted to prevent fluidization therein, means for maintaining a pressure within said induction chamber greater than that of the outlet of said conveyance conduit, and means for depressuring said conveyance fluid cocurrently through said conveyance conduit with granular solids, the improvement which comprises an enlarged expansion chamber established surrounding the discharge opening of said conveyance conduit, said expansion chamber having a cross sectional area greater than that of said discharge opening and adapted to reduce the conveyance forces therein to values insufficient to convey said granular solids and thereby establish a "dead bed" of compact unfluidized solids submerging said discharge opening whereby a reverse thrust force is generated which maintains the granular solids within said conveyance conduit in substantially compact form while in motion, means for removing conveyance fluid from said expansion zone, and means for removing a controlled flow rate of granular solids from expansion zone.

31. An apparatus for the conveyance of granular solids in substantially compact unfluidized form which comprises an elongated conveyance conduit, an induction chamber communicating with the conduit inlet, a separator chamber communicating with the conduit outlet, inlet conduits into said induction chamber for a conveyance fluid and for solids to be conveyed, means for maintaining said induction chamber at a pressure in excess of that of said separator chamber to depressure said conveyance fluid through said conveyance conduit to establish conveyance forces sufficient to convey the solids therein, means within said separator chamber for restricting the flow of compact unfluidized solids thereinto from said conveyance conduit to maintain solids during conveyance in a substantially compact unfluidized state, said last named means comprising an expansion chamber in solids-receiving relation to said conveyance conduit and adapted to reduce said conveyance forces therein to values insufficient to convey said solids thereby establishing a "dead bed" of compact unfluidized solids therein, means for flowing granular solids from said "dead bed" into said separator chamber, and means for withdrawing depressured conveyance fluid and said solids from said separator chamber.

32. An apparatus for conveyance of unfluidized granular solids in compact form through a conduit by means of a conveyance fluid which comprises an induction chamber communicating with the inlet opening of an elongated conveyance conduit, means for introducing a compact unfluidized mass of solids into said induction chamber to submerge said inlet opening and adapted to prevent fluidization of solids therein, means for introducing a conveyance fluid into said induction chamber at a point above said unfluidized mass of solids, means for maintaining the pressure of said induction chamber substantially above the pressure of the outlet opening of said conduit, an expansion chamber in solids- and conveyance fluid-receiving relation to said outlet opening, said expansion chamber having a cross sectional area open to conveyance fluid flow sufficiently greater than that of said outlet opening to reduce the conveyance forces exerted by the depressuring conveyance fluid to values insufficient for conveyance and thereby establish a "dead bed" of unfluidized solids within said expansion chamber, said expansion chamber being further adapted to submerge said outlet opening of said conduit by means of said "dead bed," an outlet for depressured fluid above said "dead bed" of solids, and an outlet of controllable area for removing conveyed solids from the bottom of said "dead bed."

33. An apparatus for conveyance of unfluidized granular solids in compact form through a conduit by means of a conveyance fluid which comprises an induction chamber communicating with the inlet opening of an elongated conveyance conduit, means for introducing a compact unfluidized mass of solids into said induction chamber to submerge said inlet opening and adapted to prevent fluidization of solids therein, means for introducing a conveyance fluid into said induction chamber at a point above said unfluidized mass of solids, means for maintaining the pressure of said induction chamber substantially above the pressure of the outlet opening of said conduit, an expansion chamber in solids- and conveyance fluid-receiving relation to the outlet opening of said conveyance conduit, said expansion chamber comprising a cylindrical section which is provided with an upper flared portion, at least one dependent outlet conduit for solids from the bottom of said expansion chamber, means for controlling the rate of solids withdrawal from said expansion chamber so as to maintain a "dead bed" of compact solids therein submerging said outlet opening of said conveyance conduit, the transverse cross-sectional area of said expansion chamber being sufficiently greater than the outlet opening of said conveyance conduit to reduce the conveyance force ratio therein to a value less than 1.0 and thereby establish said "dead bed" of solids, a transverse guard plate superimposed on said expansion chamber, and an outlet conduit for depressured conveyance fluid from the top of said expansion chamber.

34. An apparatus according to claim 33 wherein said conveyance conduit has a cross-sectional area open for solids flow which increases in the direction of flow.

35. An apparatus for the conveyance of granular solids which comprises an elongated conveyance conduit, a solids receiving chamber communicating with the outlet opening of said conveyance conduit, means for maintaining an accumulation of solids to be conveyed at the inlet opening of said conveyance conduit, means for passing a conveyance fluid through said conveyance conduit at a rate sufficient to convey said solids cocurrently therewith through said conveyance conduit into said solids receiving chamber, means for removing at least a portion of said conveyance fluid from said conveyance conduit at a point immediately adjacent said outlet opening thereof so that the remaining portion of conveyance fluid flowing with said solids into said solids receiving chamber is insufficient to convey said solids from the removal point to said outlet opening so as to maintain a bed of solids between these points to exert a force against the solids being conveyed by said conveyance fluid in said conveyance conduit and maintain solids throughout said conduit at a bulk density substantially equal to their bulk density when at rest, an outlet for said remaining portion of said conveyance fluid from said solids-receiving chamber, an outlet for conveyed solids opening therefrom, and means in said last-named outlet for controlling the rate of solids removal therefrom.

References Cited in the file of this patent

UNITED STATES PATENTS

| Number | Name | Date |
| --- | --- | --- |
| 727,030 | Talghman | May 5, 1903 |
| 788,741 | Trump | May 2, 1905 |
| 2,304,827 | Jewell | Dec. 15, 1942 |
| 2,398,759 | Angell | Apr. 23, 1946 |
| 2,414,373 | Gerhold | Jan. 14, 1947 |
| 2,433,726 | Angell | Dec. 30, 1947 |
| 2,463,623 | Huff | Mar. 8, 1949 |
| 2,509,983 | Morrow | May 30, 1950 |
| 2,509,984 | Morrow | May 30, 1950 |
| 2,561,771 | Ardern | July 24, 1951 |

FOREIGN PATENTS

| Number | Country | Date |
| --- | --- | --- |
| 180,397 | Great Britain | May 11, 1922 |